United States Statutory Invention Registration [19]

[11] Reg. Number: H158

Frausto et al. [43] Published: Nov. 4, 1986

[54] METHOD OF BONDING AN ELECTRICALLY CONDUCTIVE MATERIAL TO AN ELECTRICALLY CONDUCTIVE LAYER WHICH OVERLIES A CURVED NON-METALLIC SUBSTRATE

[75] Inventors: Philip R. Frausto; Charles E. Wickersham, both of Columbus, Ohio; Thomas R. Tucker, Alexandria, Va.

[73] Assignee: The United States of America as represented by the Secretary of the Army, Washington, D.C.

[21] Appl. No.: 797,063

[22] Filed: Nov. 12, 1985

[51] Int. Cl.[4] ..... B23K 9/00

[52] U.S. Cl. ..... 219/121 LD

*Primary Examiner*—Stephen C. Buczinski
*Assistant Examiner*—Linda J. Wallace
*Attorney, Agent, or Firm*—Anthony T. Lane; Harold H. Card, Jr.; Michael C. Sachs

[57] ABSTRACT

An improved method is disclosed of bonding an electrically conductive material to an electrically conductive layer which is adhered to and which overlies a curved non-metallic substrate. This method comprises providing a non-metallic substrate with a curved surface. This substrate has adhered to its surface an electrically conductive layer. An electrically conductive material which is to be bonded to the electrically conductive layer is placed on the electrically conductive layer. A rigid, substantially inert and transparent to laser beam energy, cover means is placed on the electrically conductive material sufficiently to hold the electrically conductive material against the electrically conductive layer. A high energy density pulsed laser beam is directed on the materials at a sufficiently high energy density thereby welding the materials together.

10 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF BONDING AN ELECTRICALLY CONDUCTIVE MATERIAL TO AN ELECTRICALLY CONDUCTIVE LAYER WHICH OVERLIES A CURVED NON-METALLIC SUBSTRATE

The invention described herein may be manufactured, used and licensed by or for the Government for Governmental purposes without the payment to us of any royalties thereon.

BACKGROUND OF THE INVENTION

1. Field of the Invention

This invention relates to the art of laser welding and more particularly to a method of laser welding an electrically conductive material, such as an electrical lead, to an electrically conductive layer which has been adhered to and which overlies a curved non-metallic substrate.

2. History of the Prior Art

Welding or connecting aluminum foil leads to aluminum coated non-metallic, curved substrates has previously been accomplished by utilizing several mechanical welding or soldering techniques. One of these techniques has been the utilization of an ultrasonic mechanical bonding technique which comprises placing very small welding points on the materials to be bonded together. During this process twenty to thirty welding points are needed in order to make a bond. This technique has not been reliable in either strength or endurance. New methods were sought which would produce a strong and durable bond. In order to produce strong and durable welding bonds, there must be good contact between the materials to be bonded during the bonding process. This is particularly difficult when one of the materials has a curved surface as in the instant invention and the substrate containing one of the materials thereon, is non-metallic.

SUMMARY

It is an object of this invention to provide a method of bonding an electrically conductive material to an electrically conductive layer which have been adhered to and which overlies a curved non-metallic substrate.

It is a further object of this invention to provide a method of adhering or welding metallic leads such as an aluminum foil electrical lead to a metallic layer, such as an aluminum which has been adhered to and overlies a curved non-metallic substrate, such as glass.

It is a further object of this invention to provide a method of welding an electrically conductive material to an electrically conductive layer containing a curved surface by using a high energy density pulsed laser beam which is directed on the material while the material is being held in place on a curved surface by a rigid, substantially inert and transparent to laser beam energy, cover means.

BRIEF DESCRIPTION OF THE PREFERRED EMBODIMENTS

Figure 1:
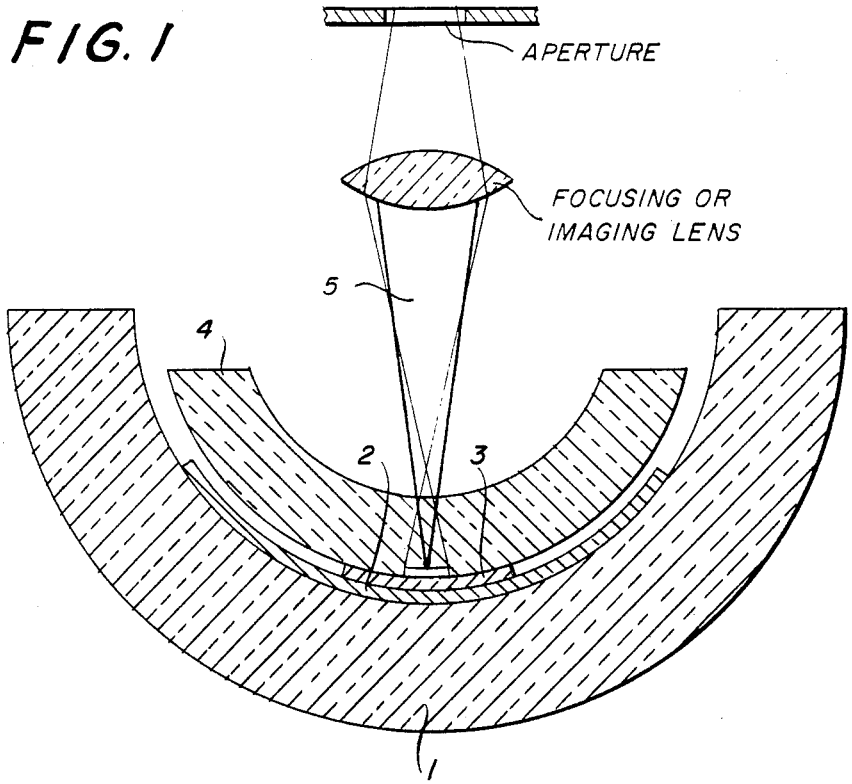
FIG. 1 is a cross sectional view through the materials of the instant invention which are in place for welding utilizing a laser beam which is being focused from the cover means side.

FIG. 1 shows the working materials of the instant invention in cross sectional view.

Figure 2:
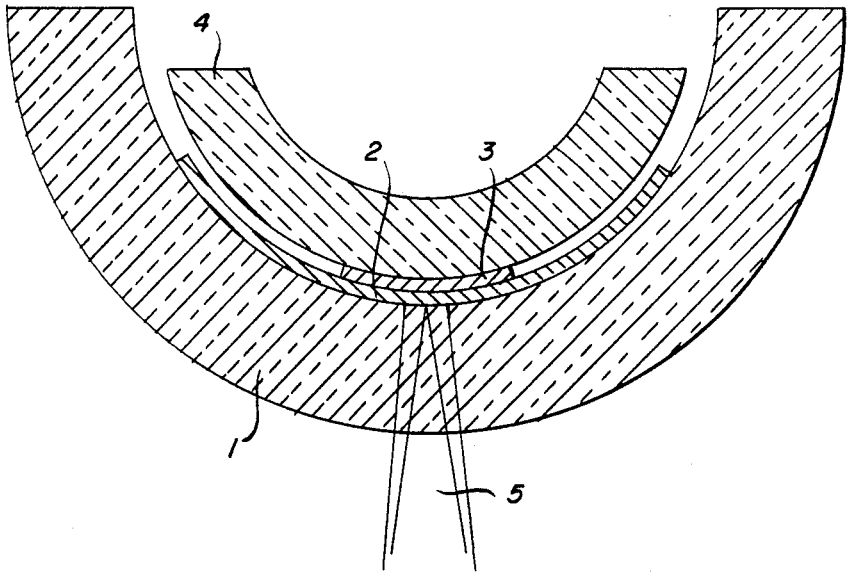
FIG. 2 is a cross sectional view through the working materials of the instant invention which are in place for welding with the laser beam being focused from the substrate side.

Seen in FIG. 1 in this cross sectional view is substrate 1. Substrate 1 comprises a curved non-metallic substrate which may be transparent to a high energy density laser beam, or non-transparent. Substrate 1 may be merely non-metallic as illustrated in FIG. 1 or substrate 1 may be a rigid, non-metallic, substantially inert to laser beam energy and substantially transparent to laser beam energy as illustrated in FIG. 2. Preferrably substrate 1 is glass and uniformly curved. More preferably substrate 1 is selected from the group consisting of optical glass, quartz glass and ceramic glass. Electrically conductive layer 2 is adhered to and overlying curved nonmetallic substrate 1. Electrically conducted layer 2 preferably is a metallic layer. More preferably, layer 2 is selected from the group consisting of aluminum, chromium, copper, gold, iron, magnesium, nickel, platinum, silver, tantalum, titanium, tin, tungsten, and zinc. Most preferably electrically conductive layer 2 is aluminum. Electrically conductive material 3 is a material which when a high energy density laser beam is focused on it at a sufficient energy level, material 3 will weld to electrically conductive layer 2. Electrically conductive material 3 is preferably a metallic material. More preferably, material 3 is a material selected from the group consisting of aluminum, chromium, copper, gold, iron, magnesium, nickel, platinum, silver, tantalum, titanium, tin, tungsten and zinc. Most preferably electrically conducted material 3 is aluminum in the form of aluminum foil comprising an aluminum foil electrical lead. Cover means 4 is a rigid, substantially inert and transparent to laser beam energy, cover as illustrated in FIG. 2. As illustrated in FIG. 1, cover means 4 is a rigid, substantially inert to laser beam energy, substantially transparent to laser beam energy, cover. This cover 4 is used to hold electrically conductive material 3 firmly against electrically conductive layer 2 during the welding process. When the term "substantially inert to laser beam energy" is used herein it is meant to mean that when a high energy density laser beam is focused on and through this material during the welding process described herein, that the material will not deteriorate or be affected in any way by the laser beam being focused on or passing there through. When the term, electrically conductive, is used herein, it is meant to mean that the material will allow an electric current, i.e., electricity, to pass through the material, i.e., this material conveys or conducts electricity.

When the term "substantially transparent to laser beam energy is used herein" it is meant to mean that the material will allow high energy density laser beams to pass through the material without significantly distorting or affecting these beams. The laser wave length must be such that a transparent cover material can be found; i.e., 1 mm. wave length lasers can employ fired silica or quartz transparent materials.

High energy density beam 5 may be generated from any high energy density laser source known in the art which can be focused. The energy density must be such that it is of high enough energy density when focused to create a bond between the electrically conductive material 3 and the electrically conductive layer 2. The energy density should not be high enough so that any of the materials including the substrate material are destroyed. The power of the laser may be increased so that a metal to metal bond is created. There may be an intermixing of the non-metallic substrate material with both the electrically conductive material 3 and the electrically conductive layer 2. In some cases the substrate may be intermixing with these two electrically conductive materials.

FIG. 2 represents a cross sectional view of the materials illustrating laser beam 5 being reimaged onto the bond plane from a circular aperture spaced above on the substrate 1 side of the materials. This requires, as mentioned above, that non-metallic substrate 1 be substantially inert to laser beam energy and substantially transparent to laser beam energy. Preferably the substrate material, as illustrated in FIG. 2, would be a rigid substantially inert to laser beam energy, substantially transparent to laser beam energy, non-metallic substrate and the cover means 4 would need only be rigid and substantially inert to laser beam energy when the laser beam is being focused from the substrate 1 side of the configuration. When the beam is directed from the cover means 4 side of the materials, as illustrated in FIG. 1, the substrate need only be a non-metallic material.

As seen in FIG. 1, a method of bonding electrically conductive material 3 to electrically conductive layer 2 comprises providing a curved non-metallic substrate 1 which has adhered to its surface and which is in conformity to its curved surface electrically conductive layer 2. Electrically conductive material 3 is placed on electrically conductive layer 2. These materials are positioned such that electrically conductive material 3 may be welded or bonded to electrically conductive layer 2. After electrically conductive material 3 has been positioned for welding, cover means 4 is placed in sufficient contact with electrically conductive material 3 to hold electrically conductive material 3 in intimate contact on electrically conductive layer 2. It is preferred that cover means 4 be of the same curvature as non-metallic substrate 1 which contains electrically conductive layer 2 thereon. As mentioned, cover means 4 is pressed firmly against these materials during the welding step. High energy density laser beam 5 is reimaged on material 3 and energized sufficiently so that electrically conductive material 3 is welded to electrically conductive layer 2. As mentioned above, during this welding process the energy density of the laser beam must be such that it is high enough to create a bond between electrically conductive material 3 and electrically conductive layer 2. However, this energy density should not be high enough so that the substrate material is destroyed. The energy of the laser beam may be increased so that the metal to metal bond between layer 2 and material 3 may contain an intermixing of these materials plus substrate material 1. A preferred method is to adhere the material 3 to layer 2 or to adhere material 3 to both layer 2 and substrate 1. However, as illustrated in FIG. 2, layer 2 may be adhered to layer 3.

The curvature of substrate 1 is usually a standard curve. Cover means 4 can easily be manufactured to coincide with this curve. However, cover means 4 may be small enough so that merely locating cover means 4 at the contact point would result in every point of the contact matching up with the curvature of the substrate.

More specifically the instant invention comprises a method of bonding an electrically conductive material to an electrically conductive layer adhered to and overlying a curved non-metallic substrate comprising; providing a non-metallic substrate with a curved surface having adhered thereto in conformity to said curved surface an electrically conductive layer, placing an electrically conductive material to be bonded to the electrically conductive layer on said electrically conductive layer, then placing in contact with said electrically conductive material sufficient to hold said material against said electrically conductive layer, a rigid, substantially inert to laser beam energy, substantially transparent to laser beam energy, cover means to hold said electrically conductive material against said electrically conductive layer and then directing a high energy density laser beam through said cover means on said electrically conductive material at sufficiently high energy density welding said material to said layer.

A preferred method as illustrated in FIG. 2 comprises utilizes a non-metallic curved substrate which is substantially transparent to high energy density laser beams and substantially inert to said laser beams. The laser beam is directed through said transparent substrate onto said electrically conductive layer 2 welding said layer 2 to said electrically conductive material 3.

The most preferred method herein as illustrated by FIG. 1 comprises utilizing cover means 4 as in FIG. 2. However, in addition to cover means 4 being rigid, cover means 4 in FIG. 1 is substantially inert to high energy density laser beams and substantially transparent to the laser beams. The laser beam is directed through cover means 4 onto electrically conductive material 3 welding material 3 to layer 2.

A further description of the invention and a further understanding can be obtained by reference to certain specific examples which are provided herein for purposes of illustration only and are not intended to be limiting unless otherwise specified.

EXAMPLE 1

A laser set to operate at a one millisecond pulse was directed through a 0.185 inch diameter circular aperture to a reimaging lens and subsequently to a member which contained an uncoated glass cover, an aluminum foil lead overlying an aluminum coated glass substrate located between 17 and 20 centimeters below the lens. A number of pulse laser shots were made on the member through the uncoated glass cover side to melt the aluminum foil to the aluminum coated glass substrate. The 1–2 mil thick aluminum foil lead was positioned with the dull side facing the laser. The aluminum coating on the glass substrate plate was 1–2 mils thick. Sixteen shots, in a series of fours, were made at a distance of 20 centimeters from the lens to the top of the cover glass on the member. The beam size at this distance was approximately 0.05 $cm^2$. Shots 1 through 4 were made at 2.5 KV, shots 5 through 8 were made at 2.8 KV, shots 9 through 12 were made at 2.9 KV, and shots 13 through 16 were made at 2.99 KV. Sixteen additional shots were made using a distance of 18 centimeters from the lense to the cover glass on the member. Beam size was approximately 0.03 $cm^2$. Shots 17 through 20 were done at 2.5 KV, shots 21 through 24 at 2.4 KV, shots 25 through 28 at 2.1 KV, shots 29 through 32 at 2.2 KV, and shots 33 through 36 at 2.25 KV. In subsequent tensile test shots 17 through 20 exhibited the highest strength failing at 120 grams load. It was determined that a portion of the bonding strength was due to interaction between the aluminum coated glass substrate and the aluminum foil lead. Curved geometries were irradiated using the laser beam through an uncoated curved pressure plate (cover glass) clamped to a member containing a 1–2 mil aluminum foil lead overlying a curved aluminum coated glass substrate. The curve in the glass cover coincides with the curve of the substrate.

Having now fully described this invention, it will be apparent to one of ordinary skill in the art that many changes and modifications can be made thereto without departing from the spirit or scope of the invention set forth herein.

I claim:

1. A method of bonding an electrically conductive material to an electrically conductive layer adhered to and overlying a curved, nonmetallic substrate comprising:

providing a non-metallic substrate with a curved surface having adhered thereto in conformity to said curved surface an electrically conductive layer, placing an electrically conductive material to be bonded to said electrically conductive layer on said layer, then placing in contact with said electrically conductive material sufficient to hold said material against said layer, a rigid, substantially inert to high density laser beam energy, substantially transparent to laser beam energy, cover means to hold said electrically conductive material against said electrically conductive layer and then directing a high energy density laser beam through said cover means and on said electrically conductive material at sufficiently high energy density and in a constant power density spot, welding said electrically conductive material to said electrically conductive layer.

2. The method according to claim 1 wherein said cover means is is glass.

3. The method according to claim 2 wherein said cover means is selected from the group consisting of optical glass, quartz glass and ceramic glass.

4. The method according to claim 3 wherein said cover means is optical glass.

5. The method according to claim 1 wherein the electrically conductive material is selected from the group consisting of aluminum, chromium, copper, gold, iron, manganese, nickel, platinum, silver, tantalum, titanium, tin, tungsten, and zinc.

6. The method according to claim 5 wherein the electrically conductive material is aluminum.

7. The method according to claim 6 wherein the electrically conductive material is in the form of an electrically conductive aluminum foil lead.

8. The method according to claim 1 wherein the electrically conductive layer is selected from the group consisting of aluminum, chromium, copper, gold, iron, manganese, nickel, platinum, silver, tantalum, titanium, tin, tungsten, and zinc.

9. The method according to claim 8 wherein the electrically conductive layer is aluminum.

10. A method of bonding an electrically conductive material to an electrically conductive layer adhered to and overlying a curved nonmetallic substrate comprising:

providing a non-metallic, substantially inert to high density laser beam energy and substantially transparent to high density laser beam energy, substrate with a curved surface having adhered thereto in conformity to said curved surface an electrically conductive layer, placing an electrically conductive material to be bonded to said electrically conductive layer on said layer, then placing in contact with said electrically conductive material sufficient to hold said material against said layer, a rigid, substantially inert to high density laser beam energy, cover means to hold said material against said layer, then directing a high energy density laser beam through said substrate and on said layer at sufficiently high energy density welding said layer to said material.

* * * * *